United States Patent [19]

Tontarelli

[11] Patent Number: 4,750,697
[45] Date of Patent: Jun. 14, 1988

[54] HOOK FOR COAT-HANGERS, EQUIPPED WITH A DOUBLE-JOINTED SUPPORTING BASE

[76] Inventor: Sergio Tontarelli, Via Giolitti 62, Castelfidardo, Italy

[21] Appl. No.: 933,110

[22] Filed: Nov. 21, 1986

[51] Int. Cl.⁴ ............................................. A47B 96/06
[52] U.S. Cl. .................................. 248/215; 24/669;
24/372; 248/227; 248/304; 248/308; 248/340;
403/331; 403/381
[58] Field of Search ............... 248/215, 339, 340, 341,
248/227, 304, 308, 231.8, 297.2; 403/331, 381,
345, 71; 211/115; 24/669, 702, 372; 223/89, 94,
85, DIG. 4

[56] References Cited

U.S. PATENT DOCUMENTS

| | | | |
|---|---|---|---|
| 2,304,547 | 12/1942 | Cutter | 248/339 UX |
| 2,959,332 | 11/1960 | Spitz | 223/94 |
| 2,987,289 | 6/1961 | Wamsley | 248/341 |
| 3,228,738 | 1/1966 | Koffler | 248/308 |
| 3,254,814 | 6/1966 | Weir et al. | 223/89 |
| 3,289,985 | 12/1966 | Sheiman | 248/308 X |
| 3,358,339 | 12/1967 | Strehlein | 24/669 |
| 3,474,244 | 10/1969 | Hanlon | 248/339 |
| 3,860,154 | 1/1975 | Atkins | 223/94 X |
| 3,870,206 | 3/1975 | Feinberg | 248/340 X |
| 3,995,822 | 12/1976 | Einhorn et al. | 248/339 X |
| 4,112,550 | 9/1978 | DeWitt et al. | 248/227 |
| 4,174,087 | 11/1979 | Gaines | 248/339 |

FOREIGN PATENT DOCUMENTS 0816981 10/1951 Fed. Rep. of Germany ........ 24/669

*Primary Examiner*—Ramon O. Ramirez
*Attorney, Agent, or Firm*—Leonard Bloom

[57] ABSTRACT

A separable hook for a hanger (for garments) is pivotably mounted to the hanger about a horizontal axis, so that when the hanger is not in use, the hook may be swiveled about the horizontal axis and folded or collapsed within the frame or main body portion of the hanger, thereby saving space for storage or shipment of the hanger. Additionally, the hook includes a base portion and a hook portion pivotably mounted to each other about a vertical axis. With this arrangement, when the hanger with its garment is in use, that is, attached to the hook and the hook received on a fixed horizontal support, the hanger (with its garment thereon) may be swiveled about the vertical axis.

5 Claims, 2 Drawing Sheets

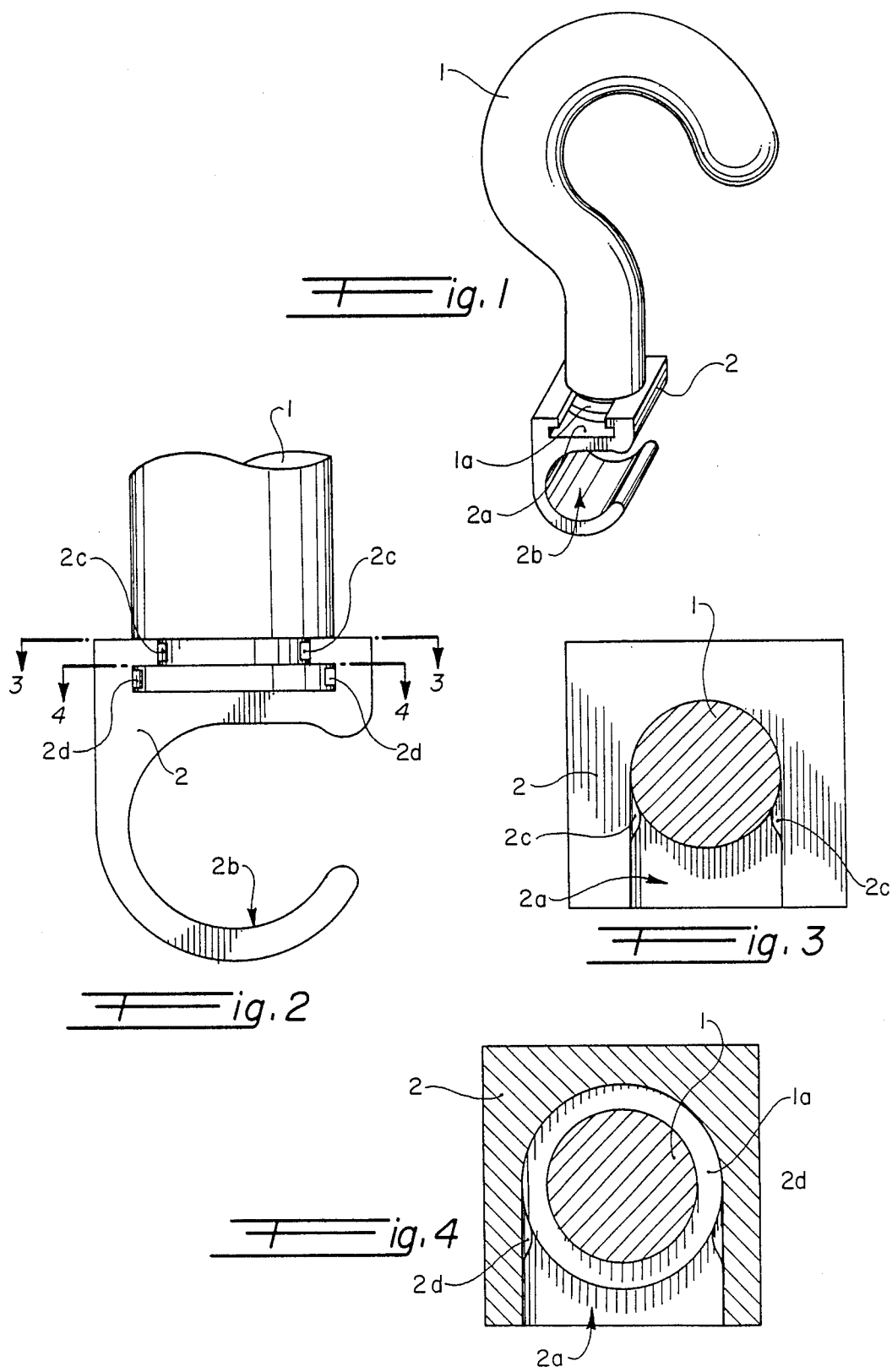

HOOK FOR COAT-HANGERS, EQUIPPED WITH A DOUBLE-JOINTED SUPPORTING BASE

FIELD OF THE INVENTION

The present invention relates to a hook for coat hangers, and more particularly, to a hook which is equipped with a double jointed support base that allows the hook to rotate freely around both a vertical and horizontal axis.

BACKGROUND OF THE INVENTION

While the coat hangers of the prior art are sufficient for most purposes, nevertheless, they have certain disadvantages intended to be alleviated by the present invention, which constitutes an improvement over the art.

SUMMARY OF THE INVENTION

According to the present invention, the hook has been designed to satisfy the necessity of minimizing the overall dimensions of conventional coat hangers; it is thus possible to reduce packaging and transport costs, as a greater number of hangers will be contained in the same space or carton.

Having established that packing of the hangers usually occurs by opposing two hangers on the same plane and superimposing the hooks so as to reduce the space occupied transversally to a minimum, this invention proposes an internally collapsible hook for the hanger, so that the space occupied transversally by two opposed hangers during packing can be further reduced by a quantity equivalent to the height of the hook itself.

Realization of such a collapsible hook has been carried out taking into account the possible rotation of the hook on a vertical axis, which is a characteristic of most of the hanger hooks on the market, be they in plastic or metal.

Keeping this in mind, a new type of hook has been invented, equipped with a supporting base to be hooked onto the upper bar of the coat hanger. This supporting base allows the hook itself to rotate around two orthogonal or mutually-perpendicular axes, comprising vertical and horizontal axes. In this manner, the base can rotate (with its hook) around the upper bar of the hanger, so as to facilitate the collapsibility of the hook. Additionally, the hook is also able to rotate in relation to its supporting base, around a vertical axis, which is perpendicular to the upper bar of the hanger.

For clarity, the description continues with reference to the attached drawings, shown merely for illustrative purposes, and not restrictive.

BRIEF DESCRIPTION OF THE DRAWINGS

FIG. 1 is an isometric view of the hook, according to the invention.

FIG. 2 is a side elevational view of the hook, according to the invention.

FIG. 3 is a cross-sectional view, taken along the lines 3—3 of FIG. 2.

FIG. 4 is a further cross-sectional view, taken along the lines 4—4 of FIG. 2.

GENERAL DESCRIPTION OF THE PREFERRED EMBODIMENT

Figure 7:
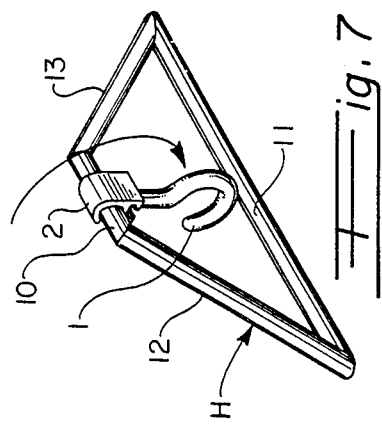
FIG. 7 is a further perspective view of the hook and hanger of the present invention, showing the hook folded down within the hanger for compactness in shipment or storage.

Referring to the above-mentioned figures, the model herein described includes a hook (1) having a circular base forming a bearing journal (1a). This bearing journal (1a) is of such shape and size so as to be complemental to, and received within, a blind channel (2a). This blind channel (2a), which has an inverted T cross-section, is formed in a supporting and swiveling base portion (2). This base portion (2) is preferably molded in plastic, in one piece only. The base portion (2) includes a plate (within which the blind channel (2a) is formed and the plate is connected to an open ring (2b) having a circular cross-section, so that its profile should resemble a "C" flattened in its upper portion.

The open ring (2b) with its circular cross-section (as shown in FIGS. 1 and 2 of the drawings) can be easily hooked onto the neck of the hanger using only a slight pressure sufficient to elastically expand the ring itself. At the connection point, the neck of the hanger should include a portion having a horizontal bar with a circular cross-section corresponding exactly in its diameter, to the inside diameter of the open ring (2b).

The blind channel (2a) is designed for the insertion of the bearing journal (1a) of the hook (1), which remains fixed as there are two pairs of opposed nibs or protuberances (2c) and (2d) on the side edges of the blind channel (2a); after the protuberances (2c) and (2d) have been opened to permit insertion of the bearing journal (1a) of the hook, the protuberances (2c) and (2d) close back onto the bearing journal (1a) and around it with an elastic snap, that is, the protuberances (2c) and (2d) are elastically deformed.

With reference to the above-mentioned figures, it is now clear how the hook, according to the invention, can be collapsed inside the hanger without losing its freedom of rotation round its longitudinal axis; that is, the entire hook (1) may be rotated about the horizontal axis of the circular opening (2b) to collapse the hook (1) within the frame or main body portion of the hanger. In fact, the collapse of the hook is obtained with the rotation of the circular portion of the open ring (2b) around the neck of the hanger, whilst the rotation or swiveling of the hook (1) around its own vertical axis is facilitated by the bearing journal (1a) of the hook itself, as the bearing journal (1a) is retained within the blind channel (2a) of the supporting base portion (2).

As shown in the drawings, particularly FIG. 2, the blind channel (2a) further has a second socket for the reduced diameter portion of the hook portion, above its bearing journal (1a).

Figure 6:
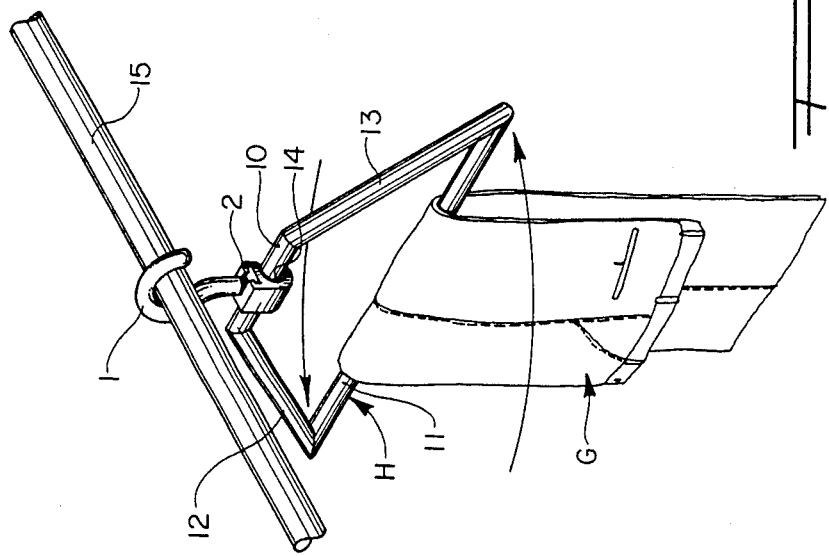
FIG. 6 is a further perspective view, corresponding substantially to that of FIG. 5, but showing the hanger swiveled on the hook of the present invention.
Figure 5:
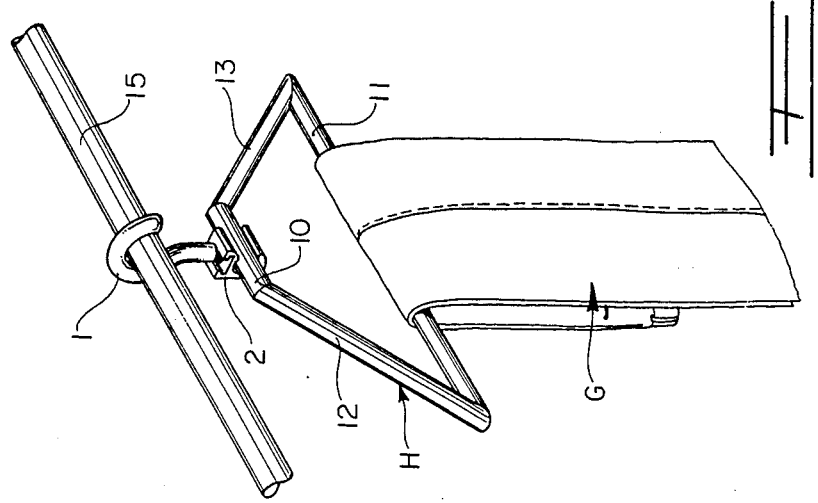
FIG. 5 is a perspective view, illustrating the hook of the present invention engaging a rod or pipe, the hanger supported by the hook, and a garment (in this case, a pair of trousers) supported by the hanger.

With reference to FIGS. 5-7, a hanger H has a top portion 10, a bottom portion 11, and respective side portions 12 and 13 connecting the top portion 10 to the bottom portion 11. The bottom portion 10 supports a garment G which, for example, may be a pair of trousers as shown in the drawings. The hanger H, and at least the top portion 10 thereof, has a circular cross-section. Accordingly, the top portion of the hanger H may be received within the circular opening 14 in the base portion 2. When the hook 1 is removed from the rod or pipe 15, as shown in FIG. 7, the hook 1 may be swiveled into the hanger H, thereby forming a compact structure for storage or shipment of the hanger H (or a plurality thereof).

I claim:

1. In a hanger for articles of clothing, wherein the hanger includes a main body portion having a substantially circular cross-section, the combination of a hook including a base portion having a lowermost portion provided with a substantially circular opening, the circular opening being formed about a first substantially-horizontal axis, and the circular opening being accessible laterally thereof and in a direction substantially perpendicular to the horizontal axis, wherein the main body portion is removably received in the circular opening and is rotatably supported therein, whereby the hook is pivotable about the first substantially-horizontal axis such that the hook is collapsible within the main body portion of the hanger, the base portion of the hook further including a blind channel formed therein above the circular opening in the base portion, the blind channel having a substantially inverted "Tee" cross-section and including a lowermost portion defining a socket therein, the hook further including a lowermost portion having a radially-enlarged bearing journal received in the socket in the blind channel, the blind channel being accessible laterally thereof in a direction substantially parallel to the horizontal axis, the hook further having an annularly-relieved intermediate portion directly above the radially-enlarged bearing journal, such that the lowermost portion of the hook is removably received in the inverted "Tee" blind channel with a relatively-close rotatable fit, thereby precluding upward displacement of the hook portion relative to the base portion, yet accommodating rotary movement of the hook portion relative to the base portion, whereby the main body portion of the hanger may swivel about a second substantially vertical axis relative to the hook, and means for retaining the bearing journal in the socket, said means including the blind channel further having a pair of spaced-apart inwardly-projecting protuberances, one on each side thereof, for retaining the bearing journal in the socket in the blind channel.

2. In a hanger for articles of clothing, wherein the hanger includes a main body portion having a substantially circular cross-section, the combination of a hook including a base portion having a lowermost portion provided with a substantially circular opening, wherein the main body portion is received in the circular opening and is rotatably supported therein, whereby the hook is pivotable about a first substantially-horizontal axis such that the hook is collapsible within the main body portion of the hanger, the base portion of the hook further including a blind channel formed therein above the circular opening in the base portion, the blind channel having a substantially inverted "Tee" cross-section and including a lowermost portion defining a socket therein, the hook further including a hook portion having a lowermost radially-enlarged bearing journal received in the socket in the blind channel, thereby precluding upward displacement of the hook portion relative to the base portion, yet accommodating rotary movement of the hook portion relative to the base portion, whereby the main body portion of the hanger may swivel about a second substantially vertical axis relative to the hook, means for retaining the bearing journal in the socket;

and wherein the socket has a cut-out opening, whereby the bearing journal on the hook portion may be slidably received laterally into the socket in the base portion, and wherein the means for retaining the bearing journal in the socket comprises a pair of spaced protuberances formed on the socket at the cut-out opening therein, whereby the pair of spaced projections is elastically deformed as the bearing journal is slidably received in the socket.

3. The combination of claim 2, wherein the hook portion has a reduced diameter portion disposed above the lowermost radially-enlarged bearing journal therein, and wherein the blind channel has a second socket formed therein above the socket for the bearing journal, whereby the reduced diameter portion of the hook portion.

4. The combination of claim 3, further wherein the second socket has a cut-out opening therein, and wherein a second pair of spaced projections is formed integrally with the base portion at the opening in the second socket, the second pair of projections being elastically deformed to retain the reduced diameter portion in the second socket.

5. A hook for a hanger for an article of clothing, wherein the hook is removably supported on a fixed horizontal support and depends therefrom, comprising means for mounting the hook to the hanger, said means including means for swiveling the hook relative to the hanger about a first substantially horizontal axis, such that when the hook and the hanger are removed from the fixed horizontal support, the hook may be collapsed within the hanger for shipment or storage of the hanger, and means on the hook for swiveling the hook relative to the hanger about a second substantially vertical axis, such that when the hook and the hanger are supported upon the fixed horizontal support, the hanger and the article of clothing supported thereon may be swiveled about a vertical axis.

* * * * *